United States Patent [19]
Claussen

[11] Patent Number: 5,843,859
[45] Date of Patent: Dec. 1, 1998

[54] REACTION-FORMED MOULDED CERAMIC BODY CONTAINING MULLITE, ITS PRODUCTION AND ITS USE

[76] Inventor: Nils Claussen, Auf den Schwarzen Bergen 15, W-2107 Rosengarten, Germany

[21] Appl. No.: 108,563

[22] PCT Filed: May 28, 1991

[86] PCT No.: PCT/EP91/00986
§ 371 Date: Nov. 25, 1992
§ 102(e) Date: Nov. 25, 1992

[87] PCT Pub. No.: WO91/18846
PCT Pub. Date: Dec. 12, 1991

[30] Foreign Application Priority Data

May 29, 1990 [DE] Germany ............ 40 17 262.7
Dec. 11, 1990 [DE] Germany ............ 40 39 530.8

[51] Int. Cl.$^6$ ............ C04B 35/185; C04B 35/65
[52] U.S. Cl. ............ 501/128; 501/88; 501/96; 501/98; 501/103; 501/106; 501/118; 264/65; 264/66
[58] Field of Search ............ 501/128, 88, 96, 501/98, 103, 106, 118, 153, 154; 264/65, 66; 423/327.2

[56] References Cited

U.S. PATENT DOCUMENTS

| | | | |
|---|---|---|---|
| 4,921,818 | 5/1990 | Lesher et al. | 501/127 |
| 4,923,832 | 5/1990 | Newkirk et al. | 501/127 |
| 4,988,645 | 1/1991 | Holt et al. | 501/98 |
| 5,158,916 | 10/1992 | Claussen | 501/127 |

FOREIGN PATENT DOCUMENTS

WO 8909755  10/1989  WIPO.

OTHER PUBLICATIONS

Reed, "Introduction to the Principles of Ceramic Processing", 1988, John Wiley & Sons, pp. 261 & 266, No Month.

*Primary Examiner*—Mark L. Bell
*Assistant Examiner*—Michael Marcheschi
*Attorney, Agent, or Firm*—Felfe & Lynch

[57] ABSTRACT

A reaction-formed moulded ceramic body containing mullite is described which is obtainable by heat treating a body moulded from a finely dispersed powder mixture of aluminium, $Al_2O_3$ and a material containing Si in an atmosphere containing oxygen. Due to their properties, in particular their low shrinkage of 0 to 4% on average, the moulded bodies are very well suited for use as wear-resistant and/or high temperature-resistant components in the construction of machines, apparatuses and motors, as a cutting tool, as a component for bearings and/or seals and as a functional part in electronic instruments.

31 Claims, 2 Drawing Sheets

REACTION-FORMED MOULDED CERAMIC BODY CONTAINING MULLITE, ITS PRODUCTION AND ITS USE

This application is a 371 of PCT/EP91/00986, filed May 28, 1991.

Single and multiphase moulded bodies with a ceramic matrix are being increasingly used as temperature-resistant and wear-resistant components in mechanical engineering and in machine manufacture. Such bodies are either fabricated by means of classical ceramic (i.e. powder-metallurgical) processes by pressing and sintering or they are manufactured by reaction of metallic precursors with a gaseous or liquid phase (see. e.g. "Reaction-Formed Ceramics", Am. Ceram. Soc. Bull., 67 (1988) 356). These so-called reaction-formed ceramics have been almost exclusively limited up to now to $Si_3N_4$ (RBSN) and SiC (RBSC). A further approach to the production of multiphase ceramics in particular is to infiltrate a porous ceramic body with a metallic or ceramic phase (see e.g. Melt Infiltration Approach to Ceramic Composites", J. Am. Ceram. Soc. 71 (1988) C-96). In another new method a ceramic phase which grows through a porous ceramic body which is formed by reaction of a gas with a molten metal and can enter the porous ceramic precursor body on one or several sides (see. e.g. "Formation of Lanxide Ceramic Composite Materials", J. Mater. Res. 1 (1986) 81 DIMOX process).

All these classes of ceramics and their production processes have characteristic disadvantages. The decisive disadvantage of ceramics or ceramic composites formed by classical processes is the high linear shrinkage which occurs between the green body and the final product; it is usually 15 to 25%. This typical shrinkage is problematic when trying to maintain the shape and dimension of a moulded part and it leads to the formation of cracks and other defects which reduce the quality. The shrinkage of a ceramic matrix has a disadvantageous effect on the structural coherence particularly when strengthening elements such as fibres, platelets and whiskers or other components which do not have a concomitant shrinkage are included. The high tensions which occur as a result of the differences in shrinkage almost always lead to damaging cracks. A further characteristic disadvantage, in particular of the classically fabricated oxide ceramics, is the formation of a glass-like intergranular phase which, although accelerating the sinter and densification process, strongly impairs the mechanical high temperature properties.

Although reaction-bound ceramics, above all $Si_3N_4$ (RBSN) and SiC and also ceramics fabricated by means of the DIMOX process (among others $Al_2O_3$ and AlN), either have no shrinkage or only a very slight shrinkage, the production process is seriously impeded by the reaction periods which often take weeks. A further disadvantage of the RBSN-like ceramics is the fact that it is only possible to obtain bodies with seldom more than 85% of the theoretical density which can be attributed to the increasing reduction in nitrogen diffusion as the porosity decreases.

Experience shows that such a low density results in poor mechanical properties (see also "Review: Reaction-Bonded Silicon Nitride: its Formation and Properties", J. Marter, Sci., 14 (1979) 1017). The production of ceramic composites based on $Al_2O_3$ and AlN by a melting reaction and associated growth through a porous ceramic precursor body is described inter alia in the recently published European patent applications 0155831, 0169067, 0193292 and 0234704. Also in this case the reaction proceeds very slowly. In addition it is very time-consuming to control the dimension of the bodies.

Due to their finely-dispersed porosity, their good corrosion resistance and their resistance to temperature shock, mullite ceramics are of great importance in applications at high temperatures and under corrosive conditions. However, these ceramics have crucial disadvantages because they usually have to be sintered at high temperatures (>1650° C.) in order to achieve adequate density and strength as a result of which the $SiO_2$ components contain intergralular glass phases and usually have sinter shrinkages of >15% (cf. Ceramic Transactions, Vol. 6, "Mullite and Mullite Matrix Composites", Ed. S. Somiya, R. F. Davis, J. A. Pask, The American Ceramic Society, Inc., Westerville/Ohio, 1990).

The object of the present invention is to provide reaction-formed moulded ceramic bodies containing mullite which do not have the aforementioned disadvantages.

Figure 1:
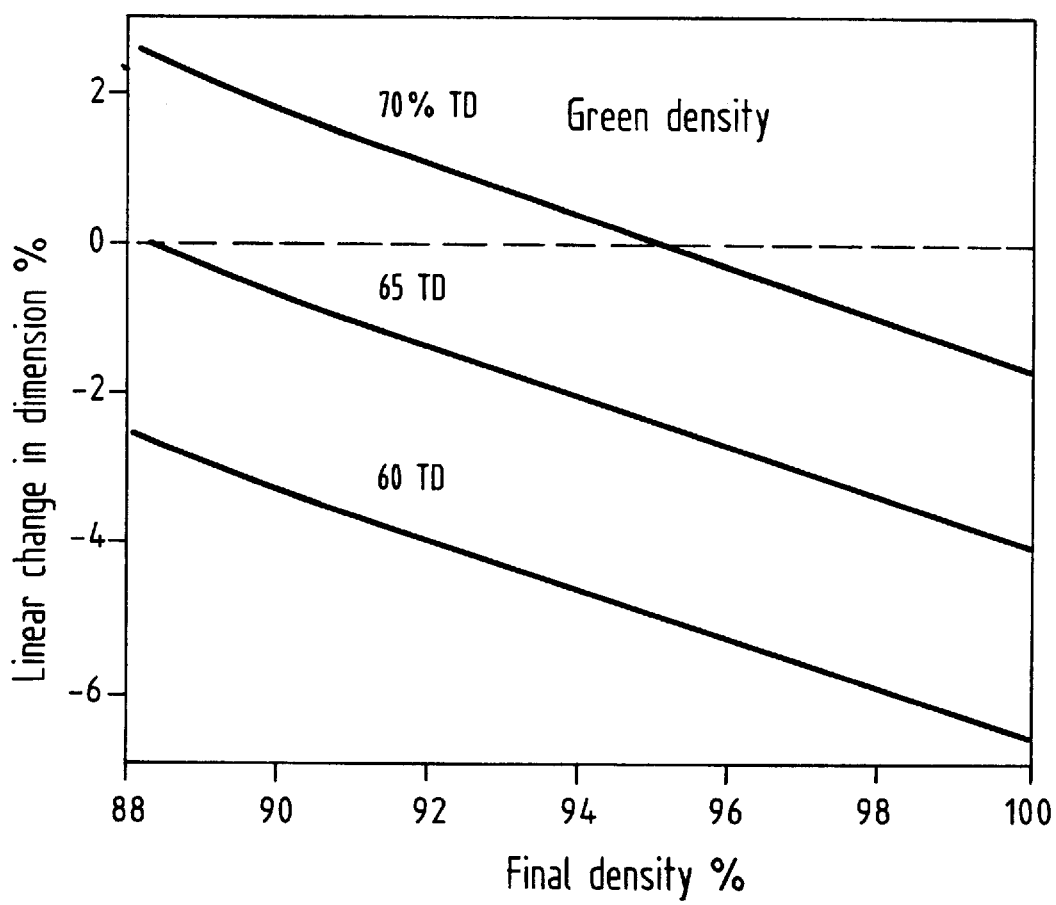
FIG. 1 shows the dependence of the change in linear dimension (L) on the final density (sinter density) as well as on the green density for an initial composition of 20 vol. % SiC, 50 vol. % Al and 30 vol. % $Al_2O_3$.

This object is achieved by the present invention. The invention concerns a reaction-formed moulded ceramic body containing mullite which is obtainable by heat-treating a body moulded from a finely-dispersed powder mixture of aluminium, $Al_2O_3$ and a material containing silicon in an oxygen-containing atmosphere.

A moulded ceramic body produced by powder metallurgy is known from DE-A-3812266 which is obtainable from at least one disperse inorganic component which is embedded in a phase of aluminium oxide and/or aluminium nitride and/or aluminium oxinitride and which is characterized in that it a) changes its length by less than ±10% compared to the green state, b) it has a porosity of less than 15% c) it has grain boundaries which are free of glass phases and can be obtained by sintering from a green body which apart from the disperse inorganic component contains at least 10 vol. % aluminium powder that can contain one or several of the alloying elements Mg, Zn, Pb, Na, Li, Se which after the sinter treatment is reacted partially or completely to form $Al_2O_3$ and/or AlN and/or aluminium oxide nitride whereby the morphology of the inorganic components dispersed in it is not changed by the sintering process.

According to a first embodiment the disperse inorganic component of the moulded ceramic body is comprised mainly or completely of $Al_2O_3$ and/or AlN in the form of powder, platelet or/and needle-like particles. According to a further preferred embodiment the disperse phase of the moulded body contains mullite, SiC, $B_4C$, TiC, $Si_3N_4$ or alloys thereof in the form of fibres, whiskers or platelets whereby the total amount in relation to the moulded body is 5 to 50 vol. %. In this case the disperse phase can be comprised solely of the said fibres, whiskers or platelets or be present in a mixture with the aforementioned particles of $Al_2O_3$ and/or AlN and, if desired, $ZrO_2$. In a further preferred embodiment the disperse inorganic component is comprised of powder particles of one or several of the carbidic phases SiC, $B_4C$, TiC, WC, TaC and/or the nitridic phase $Si_3N_4$ and/or the boridic phases $ZrB_2$ and $TiB_2$ alone or in a mixture with the aforementioned particulate forms of $Al_2O_3$ and/or AlN. By suitable choice of the compacting pressure used for the fabrication of the body and the ratio of $Al_2O_3$ to metallic aluminium it is possible to reduce the linear shrinkage or expansion to less than 1% compared to the green state.

The moulded body is fabricated by mixing one or several inorganic disperse phases, preferably $Al_2O_3$ powder, with an aluminium powder, then moulding and subsequently annealing in air at temperatures between 900° and 1600° C. During this process the metallic phase bonds the $Al_2O_3$ powder particles (or other inorganic particles) while at the same time being reacted to form $Al_2O_3$. The volume expansion associated with this reaction fills out most of the pores present in the compacts and compensates for the shrinkage caused by the sintering. By suitable choice of the compacting pressure for the green body and of the ratio of $Al_2O_3$ (or other inorganic phases or phase mixtures) to the Al powder it is possible to completely avoid a change in volume between the green body and final body. The product can be denoted reaction-formed $Al_2O_3$ (RBAO) in analogy to reaction-formed $Si_3N_4$.

It is surprising that the moulded body is formed since pure Al powder either reacts explosively under pressure and annealing conditions (when the Al has an extreme degree of fineness i.e. <ca. 10 $\mu$m) or even swells up like a yeast cake without binding the $Al_2O_3$ particles which are formed. i.e. it was to be expected that no solid body would form. However, a powder combination of $Al_2O_3$ with pure Al leads to a relatively rigid reaction-formed body. The powder form which was used of Al with, if desired, small amounts of Mg, Si and Zn powder together with at least 40 vol. % $Al_2O_3$ powder or AlN yields even denser and more rigid moulded bodies. Although it is known from the publications of W. Thiele (Aluminium, 38 (1962) 707, S. Balicki (Trace Inst. Hutn. 10 (1958) 208), M. Drouzy and C. Mascare (Metallurgical Reviews, 131 (1969) 25, M. Richard and R. Emery (Fonderie 373 (1977) 389) and from the aforementionded Lanxide applications (see among others EP 0234704) that in particular additions of Mg, Na, Se, Zn, Mn and Si accelerate the oxidation of Al melts, they would be much more likely to yield a body swollen like a yeast cake. Even if ZnO and MgO were added in amounts between about 0.1% and about 5% by weight, pure Al powder led to solid bodies. When compared to products of the Lanxide process it is particularly surprising that the metallic phase is completely oxidized to $Al_2O_3$. A possible explanation of this is provided by the high density of the grain boundaries present in the moulded body which are available as diffusion paths for oxygen. A further surprise for which no explanation has been found up to now is the fact that in the moulded bodies according to DE-A-3812266 grain boundaries without glass phases could be observed: this phenomenon can be observed in at least 30% of the examined grain boundaries.

The sintering is preferably carried out in air at temperatures between 900° and 1550° C. at a total pressure of 0.05 to 0.3 MPa.

The amount of Al powder used for the production of the green body is preferably 10 to 50 vol. % in relation to the mixture of the disperse inorganic component. If Al alloying powder is used then this can be used as such with the aforementioned alloying constituents or is comprised of a mixture of the powder of pure aluminum and the alloying elements or compounds of the alloying elements which form the alloy in situ under the sintering conditions. In particular pure unalloyed Al powder can be added in this case together with oxides of the alloying elements whereby magnesium can be used in the form of MgO or $MgAl_2O_4$, Si in the form of $SiO_2$ and Zn in the form of ZnO in amounts which correspond to between 0.1 and 10% by weight and preferably 0.5 to 20% by weight of the alloying elements. Accordingly the preferred content of metallic alloying elements in the Al alloys is 0.5 to 10% by weight Mg and/or Si and/or Zn and/or Pb and/or Se and/or Na and/or Li. It is expedient to use the $Al_2O_3$ powder with a particle size in the range from 1 to 100 $\mu$m.

It is expedient to homogenize or mechanically alloy the starting components in a ball-mill, in particular an attrition mill and the powder obtained is then processed to form the green body. The green body composed of the metal/ceramic powder mixture can then be produced by dry pressing, slick casting, injection moulding or extrusion. The milling or attrition milling is preferably carried out in a liquid medium which is inert towards the components such as acetone or an alcohol such as isopropanol.

The sintering stage itself is carried out in an oxygen or nitrogen atmosphere at a pressure between 0.05 and 10 MPa. The range between 0.08 and 0.5 MPa is preferred, the range between 0.09 and 0.11 MPa is especially preferred.

According to a particular embodiment of the process, a hot isostatic re-compression is carried out after the sinter treatment in a pressure transmission medium of Ar, $N_2$ or a mixture of Ar and $O_2$ (HIP).

For the sinter treatment the green body can usually be heated to the actual sinter temperature in a warming phase. However, the warming phase can also be omitted and the green body be directly introduced into the hot oven at temperatures between 900° and 1200° C. and kept at this temperature until the Al powder has reacted at least partially and be subsequently cooled. The holding phase is preferably set in such a way that a complete conversion of the Al powder takes place. For this purpose the actual annealing treatment at 900° to 1200° C. is still followed by a re-heating to 1300° to 1600° C. in order to ensure sintering and, if desired, a complete conversion of the aluminium.

The moulded ceramic body according to DE-A-3812266 can be used as a matrix for embedding whiskers, fibres or other strengthening shapes or various inorganic materials. In this case it is expedient to add 5 to 50 vol. % in relation to the mixture of disperse inorganic component and Al powder of fibres, whiskers or platelets which in turn can be comprised of $Al_2O_3$, mullite, $ZrO_2$, SiC, $B_4C$, TiC, $Si_3N_4$, AlN or alloys of these substances.

Apart from the preferred inorganic component already mentiond above in the form of $Al_2O_3$ and AlN, it is also possible to use powder particles composed of one or several of the carbidic phases SiC, $B_4C$, TiC, WC, TaC and/or the nitridic phase $Si_3N_4$ and/or the boridic phases $ZrB_2$ or $TiB_2$ as the disperse inorganic component. A further improvement of the physical properties of the moulded body can be achieved by infiltration of the final moulded body with liquid aluminum. In this process the pores which are still present are filled with the liquid aluminum which results in a fully dense body.

It was found that the moulded ceramic bodies according to the present invention contain high proportions of temperature-resistant mullite compared to the moulded bodies according to DE-A-3812266 described above and in addition are almost free of glass phases which is most unusual for bodies containing mullite. In addition it was found that the abrasive wear of the $ZrO_2$ milling balls (3Y-TZP: 2 mol-% $ZrO_2$ containing $Y_2O_3$) which is always present has a decisive influence on the reaction process; i.e. when $Al_2O_3$ milling balls are used, $ZrO_2$ has to be added in amounts between 2 and 10 vol. %.

Since in the production of the moulded ceramic bodies containing mullite according to the present invention the metallic aluminum is finely milled with a material containing silicon, e.g. Si, SiC, $Si_3N_4$ or $ZrSiO_4$, if desired, together with portions of $Al_2O_3$ and moulded by powder metallurgy and subsequently reactively annealed in air at temperatures between 700° C. and 1300° C., the material containing silicon is converted into reactive $SiO_2$ and partially reacts with the $Al_2O_3$ formed from the liquid Al to form mullite according to the equation:

$$3Al_2O_3 + 2SiO_2 \rightarrow 3Al_2O_3 \cdot 2SiO_2 \text{(mullite)}.$$

Although this formation of mullite is a known reaction, the fact that only a few amorphous silicatic intergranular glass phases occur was most surprising and has not yet been explained. This may be due to the fact that as a result of the reduction of the $SiO_2$ by liquid Al a more favourable transition state for the formation of mullite is formed. When $SiO_2$ and $Al_2O_3$ powder are otherwise used as usual for the reaction sintering of mullite, amorphous intergranular phases always form; however, these amourphous phases considerably impair the high temperature properties of mullite ceramics.

The reaction $Al \rightarrow Al_2O_3$ which is the basis of the production of moulded ceramic bodies disclosed in DE-A-3812266 is associated with an increase in volume of 28%; during the transition of $SiC \rightarrow SiO_2$ which occurs during the production of the moulded ceramic bodies containing mullite according to the present invention there is an increase in volume of ca. 108%. It is particularly this second expansion reaction that contributes to the fact that the shrinkage occurring during the subsequent sintering at temperatures >1300° C. can be more easily compensated than when only based on the increase in volume of the reaction $Al \rightarrow Al_2O_3$ which is the basis for the moulded ceramic body according to DE-A-3812266. In this sintering step the remaining $SiO_2$ then reacts with $Al_2O_3$ also to form mullite. As a result of the fine mullite crystals which form during the reaction it is possible to use lower sinter temperatures for the mullite ceramics according to the present invention of only ca. 1300° C. to ca. 1500° C. The very fine pores (<1 $\mu$m) which occur during this process have hardly any effect on the strength. However, the porosity can be further decreased at temperatures of >1500° C. to ca. 1700° C. Additions of $Al_2O_3$ and/or $ZrO_2$ or $ZrSiO_4$ have a particularly favourable effect on the reaction and sinter properties as well as on the mechanical properties of the moulded ceramic bodies. Such $Al_2O_3$- and $ZrO_2$-rich mullite ceramics obtained according to the process according to the present invention also have hardly any glass phases (the reaction $ZrSiO_4 + Al_2O_3 \rightarrow$ mullite$+ ZrO_2$ is also a well-known reaction; cf. e.g. J. Am. Cerm. Soc. 63 (1980), 228 and DE-A-2920795).

According to the present invention the starting components can be homogenized or mechanically alloyed in a ball mill, in particular in an attrition mill, and the powder obtained can then be processed to form a green body as stated above for the production of the moulded ceramic body according to DE-A-3812266. An effective. milling of the coarse initial Al powder can be particularly preferably achieved by attrition milling with coarse SiC and/or $Al_2O_3$ powders (3 to 30 $\mu$m) until the entire powder mixture has attained particle sizes between 0.1 and 3 $\mu$m. In order to improve the sintering and the reaction, part of the $Al_2O_3$ can also be added in a finely dispersed form (<1 $\mu$m). The component containing Si should be added in a fine (i.e. <5 $\mu$m diameter) particle form if possible. If coarse $Al_2O_3$ powder is used to facilitate the milling then for example the addition of SiC with powder particles <1 $\mu$m has a particularly advantageous effect. If TZP milling balls (tetragonal $ZrO_2$) are used this introduces $ZrO_2$ rubbings which have a particularly beneficial effect on the process. During the milling, for example in acetone or isopropanol, $Al_2O_3$ skins form on the fine Al particles which are interspersed with oxide particles of nanometer size so that the particles are passivated and thus enables a safe handling i.e. drying and further processing of the powder mixture can be carried out in air or in other oxidizing atmospheres.

According to an embodiment of the invention a portion of the aluminum can be replaced by one or several of the metals or metalloids from the group Co, Cr, Ce, Fe, Mg, Mn, Nb, Ni, Ta, Ti, Zn, Zr, Si, SiC, $Si_3N_4$ and V. In this case up to 50% of the Al originally used as powder is replaced by a metal powder or a mixture from this group. The following table shows the reactions which occur when these metals or metalloids are oxidized and their physicochemical data.

TABLE 1

Physicochemical data of some metal-oxide reactions

| Reaction | Molecular weights | density (g/cm³) | ΔV (%) | $T_{m\text{-metal}}$ (°C.) | $\Delta_f G^0$ 1400 K/0.1 MPa[KJ/mol] | |
|---|---|---|---|---|---|---|
| $2 Al + 3/2 O_2 \rightarrow Al_2O_3$ | 54/102 | 2.702, 3.97 | +28 | 660 | $-1217.5 - 0$ | $= -1217.5$ |
| $2 Ca + O_2 \rightarrow 2 CaO$ | 40/56 | 1.54, 3.25 ... 38 | $-35$ | 839 | $2(-487.8) - 0$ | $= -975.6$ |
| $2 Co + O_2 \rightarrow 2 CoO$ | 59/75 | 8.9, 6.45 | +75 | 1495 | $2(-135.7) - 0$ | $= -271.4$ |
| $2 Cr + 3/2 O_2 \rightarrow Cr_2O_3$ | 104/152 | 7.2, 5.21 | +102 | 1857 | $-751 - 0$ | $= -751.0$ |
| $2 Cu + O_2 \rightarrow 2 CuO$ | 63.5/79.5 | 8.9, 6.0 | +86 | 1085 | $2(-33.2) - 0$ | $= -66.4$ |
| $2 Fe + O_2 \rightarrow 2 FeO$ | 56/72 | 7.9, 5.7 | +77 | 1536 | $2(-181.7) - 0$ | $= -363.4$ |
| $2 Mg + O_2 \rightarrow 2 MgO$ | 24.3/40.3 | 1.74, 3.6 | $-19$ | 649 | $2(-442.9) - 0$ | $= -885.8$ |
| $2 Mn + O_2 \rightarrow 2 MuO$ | 55/71 | 7.2, 5.0 | +86 | 1244 | $2(-282) - 0$ | $= -564$ |
| $2 Nb + 5/2 O_2 \rightarrow Nb_2O_5$ | 186/266 | 8.57, 4.47 | +174 | 2468 | — | — |
| $2 Ni + O_2 \rightarrow 2 NiO$ | 58.7/74.7 | 8.9, 6.7 | +70 | 1453 | $2(-115.2) - 0$ | $= -330.4$ |
| $Si + O_2 \rightarrow SiO_2$ | 28/60 | 2.33, 2.32 | +115 | 1412 | $-661.5 - 0$ | $= -661.5$ |
| $SiC + 2 O_2 \rightarrow SiO_2 + CO_2$ | 40/60 | 3.22, 3.32 | +108 | — | $-661.5 - 396 - (-62.2)$ | $= -995.3$ |
| $Si_3N_4 + 2 O_2 \rightarrow 3 SiO_2 + 4 NO_2$ | 140/180 | 3.44, 2.32 | +90 | — | $3(-661.5) + 4(+121) - (-281.4)$ | $= -1219.1$ |
| $2 Ta + 5/2 O_2 \rightarrow Ta_2O_5$ | 362/442 | 16.6, 8.2 | +147 | 2996 | — | — |
| $Ti + O_2 \rightarrow TiO_2$ | 48/80 | 4.5, 4.26 | +76 | 1666 | $-691.6 - 0$ | $= -691.6$ |
| $2 V + 3/2 O_2 \rightarrow V_2O_3$ | 102/150 | 5.96, 4.87 | +80 | 1890 | — | — |

TABLE 1-continued

Physicochemical data of some metal-oxide reactions

| Reaction | Molecular weights | density (g/cm$^3$) | ΔV (%) | T$_{m\text{-metal}}$ (°C.) | Δ$_f$ G$^0$ 1400 K/0.1 MPa[KJ/mol] | |
|---|---|---|---|---|---|---|
| 2 V + 5/2 O$_2$ → V$_2$O$_5$ | 102/182 | 5.96, 3.36 | +216 | 668 | — | — |
| 2 Zn + O$_2$ → 2 ZnO | 65.4/81.4 | 7.1, 5.6 | +58 | 419 | 2 (−183.9) − 0 | = −367.8 |
| Zr + O$_2$ → ZrO$_2$ | 91.2/123.2 | 6.5, 5.6 | +56 | 1852 | −834.7 − 0 | = −834.7 |

The powder mixtures according to the present invention can, in particular because of the portion of ductile Al powder, be moulded without auxiliary agents for binding or pressing using all powder-metallurgical processes e.g. by isostatic pressing, extrusion, injection moulding or slip casting.

The heat treatment of the green body is preferably carried out at temperatures between 700° and 1700° C. In particular it is expedient to carry out the heat treatment in two steps and namely in such a manner that the green body is first reaction-annealed at temperatures between ca. 700° and 1300° C. and subsequently sintered at temperatures between ca. 1300° C. and 1700° C. In the first step (between 700° and 1300° C.) the reaction which forms SiO$_2$ and to some extent mullite or Al$_2$O$_3$ and mullite takes place with open porosity in a period between ca. 2 and 20 hours. The reaction period depends on the green density, the portions of the phases, the particle size of the powder and the temperature. If the mixture contains ZrO$_2$, the reaction period can be considerably shortened e.g. by a factor of about 4 with ca. 15 vol. % ZrO$_2$. Also in this case a single step reaction sintering is usually adequate. In the second step (heat treatment above 1300° C.) further SiO$_2$ reacts with Al$_2$O$_3$ to form mullite and the moulded ceramic body is sintered until it attains the desired density. The usual sintering times, preferably between 0.5 and 5 hours, are necessary for this.

The reaction in the first step is considably accelerated when the oxygen-containing atmosphere is moist, i.e. contains water vapour, when the atmosphere is agitated, when pure oxygen is used or when oxygen is used in a mixture with Ar or/and He. In this case one of the preferred acceleration methods can either be used alone or in combination with one or several of the other means of acceleration. By this means it is possible to reduce the time period of the reaction of the first heating step for a given green body composition from 8 to 15 hours in still air to 1 to 3 hours.

Therefore by selecting a suitable heat treatment within the scope of the aforementioned conditions it is possible to obtain a ceramic body with a very fine (<1 μm) open porosity. Such a body is suitable for infiltration with metallic or other inorganic phases or can be used as a filter. In order to produce such a porous body, the heat treatment is preferably carried out such that the reaction phase is combined with a short sinter phase; or the sintering is completely omitted after a relatively high reaction temperature.

Since it is possible to adjust the very low shrinkage of the ceramic containing mullite according to the present invention, non-shrinking second phases can be incorporated in the form or particles, fibres, platelets etc. without strain-related loss in strength. The ceramic according to the present invention thus represents an ideal matrix for strengthening and/or wear-reducing phases as well as for phases which can adopt other functions (e.g. electronic functions). The embedding of such phases is favoured by the low reaction temperatures. Thus for example very coarse SiC platelets (ca. 10 to 200 μm) can be embedded in a mullite/Al$_2$O$_3$ matrix in air without substantial reactions occurring during this process. Similar conditions can also be determined for other phases e.g. TiC, TiB$_2$, B$_4$C. etc. By using an appropriate procedure it is possible with mixtures of Al$_2$O$_3$ and SiC to only use an outer layer of the SiC particles for the formation of mullite ceramic while the inside of the SiC particles remains as pure Sic in the final moulded ceramic body. SiC particles with a diameter of >3 μm almost always maintain an inner SiC nucleus after the reaction and sintering.

The finely dispersed initial mixture according to the present invention preferably contains >10 vol. % and in particular 25 to 50 vol. % Al and/or Al alloy containing Si.

In a preferred embodiment the moulded ceramic body according to the present invention after heat treatment consists of 5 to 100 vol. % mullite, 0 to 80 vol. % Al$_2$O$_3$ and/or ZrO$_2$ and/or zircon and/or Al$_2$TiO$_5$ and/or cordierite and/or MgAl$_2$O$_4$ and/or further oxides listed in Table 1.

The material containing Si is preferably selected from one or several of the following materials: elementary Si, SiC, Si$_3$N$_4$, ZrSiO$_4$ (zircon), MgSiO3, cordierite. It is present in the initial mixture in an amount between 5 and 30 vol. %, preferably in an amount of at least 10 vol. %.

The aluminum powder used according to the present invention can either be completely or partially replaced by an aluminum alloying powder containing Si and in addition Al$_2$O$_3$ can also be added.

The change in length (in particular shrinkage) between the green body and the heat-treated moulded body is preferably less than ±10%, in particular less than ±1%.

In a practical embodiment, the moulded ceramic body according to the present invention can contain embedded non-shrinking strengthening and/or functional elements in the form of ball-like, platelet-like or fibre-like particles, in particular in a proportion by volume of between 5 and 50% and/or in dimensions between 5 and 500 μm. These embedded elements preferably consist of oxides, carbides, nitrides, silicides and/or borides.

The present invention also concerns a process for the production of moulded ceramic bodies according to the present invention which is characterized in that a moulded green body comprised of a finely-dispersed mixture of Al and a material containing Si is subjected to a heat treatment in an atmosphere containing oxygen.

A mixture of aluminum and the material containing Si is preferably attrition milled and a green body is then moulded from this; in particular it is attrition milled for at least one hour and in especially for 1 to 8 hours.

In a further preferred embodiment, Al powder is replaced in part by the metals set forth in Table 1 whereby those metals are particularly preferred which exhibit a large change in volume on oxidation e.g. Cr (→Cr$_2$O$_3$ 102%) or Nb (→Nb$_2$O$_5$ 174%).

In a practical embodiment the finely-dispersed powder mixture is produced by attrition milling the Al and Si and/or the compounds containing Si with coarse Al$_2$O$_3$ powder, in particular of a size between 3 and 30 μm, in a liquid medium preferably using ZrO$_2$ grinding balls and in particular TZP grinding balls. The rubbings of the grinding balls which form in this process (ca. 2 to 6 vol. % of the total mixture) has an advantageous influence on the process which is presumably of a catalytic nature. The coarse Al$_2$O$_3$ powder can be replaced in this process either entirely or partially by coarse SiC and/or Si$_3$N$_4$ powder as a support for the milling which preferably has the same particle size. Al$_2$O$_3$ must, however, be admixed in a fine form preferably <1 μm. If coarse Al$_2$O$_3$ powder is used then the component containing Si (e.g. SiC) can also be added in a very fine form (<1 μm).

The heat treatment of the green body is preferably carried out at temperatures between 700° and 1700° C. In this process it is particularly expedient to carry out the heat treatment in two stages in which the green body is firstly reaction annealed at temperatures between ca. 700° and 1300° C. and subsequently sintered at ca. 1300° C to 1700° C. In this way one obtains the desired dense and rigid body. In this process it is also possible, if desired, to select the conditions for the heat treatment so that a defined fine and open porosity is formed. This enables the pores in the moulded ceramic body obtained to be infiltrated with a liquid in a vacuum or under pressure in particular at 0.1 to 100 MPa argon pressure. The liquid for the infiltration is preferably selected from the group Al, Al alloy, Si and/or Si alloy; the liquid is especially Al and/or an Al alloy; or Si and/or a Si alloy.

In order to treat the surface it is expedient to anneal the moulded body in an atmosphere containing oxygen or nitrogen.

Embodiments of the present invention also concern reaction-formed moulded ceramic bodies containing mullite and a production process using the aforementioned initial products, reaction mixtures and reaction conditions for the moulded ceramic bodies and the process for their production according to DE-A-3812266 in combination with the use of the material containing Si which is an essential feature of the invention and in particular in combination with the aforementioned embodiments which were stated as being preferred according to the present invention.

The present invention also concerns the moulded ceramic bodies obtainable according to the aforementioned preferred embodiments or combinations thereof.

The invention also concerns the use of the moulded ceramic bodies according to the present invention as wear-resistant and/or high temperature-resistant components (construction components) in the construction of machines, apparatus and motors, as cutting tools, as components for bearings and seals, and/or as a functional part in electronic instruments.

The aforementioned possibilities of using the reaction-formed moulded ceramic bodies containing mullite according to the present invention are due to their excellent properties, in particular to the following properties:
1. The shrinkage is always below 10%, in particular below 1% and usually between 0 and 4%.
2. The moulded ceramic bodies according to the present invention have almost no amorphous intergranular phases.
3. It is possible to set a very fine open porosity, in particular of the size <1 μm;
4. Coarse second phases can be incorporated without causing stress;
5. The process temperatures are comparitively low for mullite ceramics;
6. Cheap and impure raw materials which are easily obtainable can be used.

FIG. 1 shows the dependence of the change in linear dimension (L) on the final density (sinter density) as well as on the green density for an initial composition of 20 vol. % SiC, 50 vol. % Al and 30 vol. % Al$_2$O$_3$; there is zero shrinkage at a sinter density of 95% TD, when the green body has a density of 70% TD.

The linear shrinkage (L) in percent can be expressed by the following relationship:

$$L = \left( \frac{\rho_o K}{\rho} \right)^{1/3} - 1 \quad (1)$$

in which $\rho_o$ is the green density and $\rho$ is the final density after reaction and sintering.

$$K = \Delta_1 V_1 + \Delta_2 V_2 + \Delta_3 V_3 + V_{Al2O3} \quad (2)$$

in which is the increase in volume occurring during a reaction and V denotes the volume fraction of the corresponding initial phase. If for example SiC (with formation of SiO$_2$) is used then the following applies:

$$\Delta SiC = 2.08 (108\% \text{ increase in volume}).$$

For Al (formation of Al$_2$O$_3$) the following applies:

$$\Delta Al = 1.28 (28\%),$$

and for zircon (formation of ZrO$_2$ and mullite) the equation is:

$$\Delta ZrSiO_4 = 1.27 (27\%).$$

Mixtures of 20 vol. % SiC ($V_{SiC}=0.2$), 50 vol. % Al ($V_{Al}=0.5$) and 30 vol. % Al$_2$O$_3$ ($V_{Al2O3}=0.3$) were used in examples which gave a K value of:

$$K = 2.08 \times 0.2 + 1.28 \times 0.5 + 0.3$$

Figure 2:
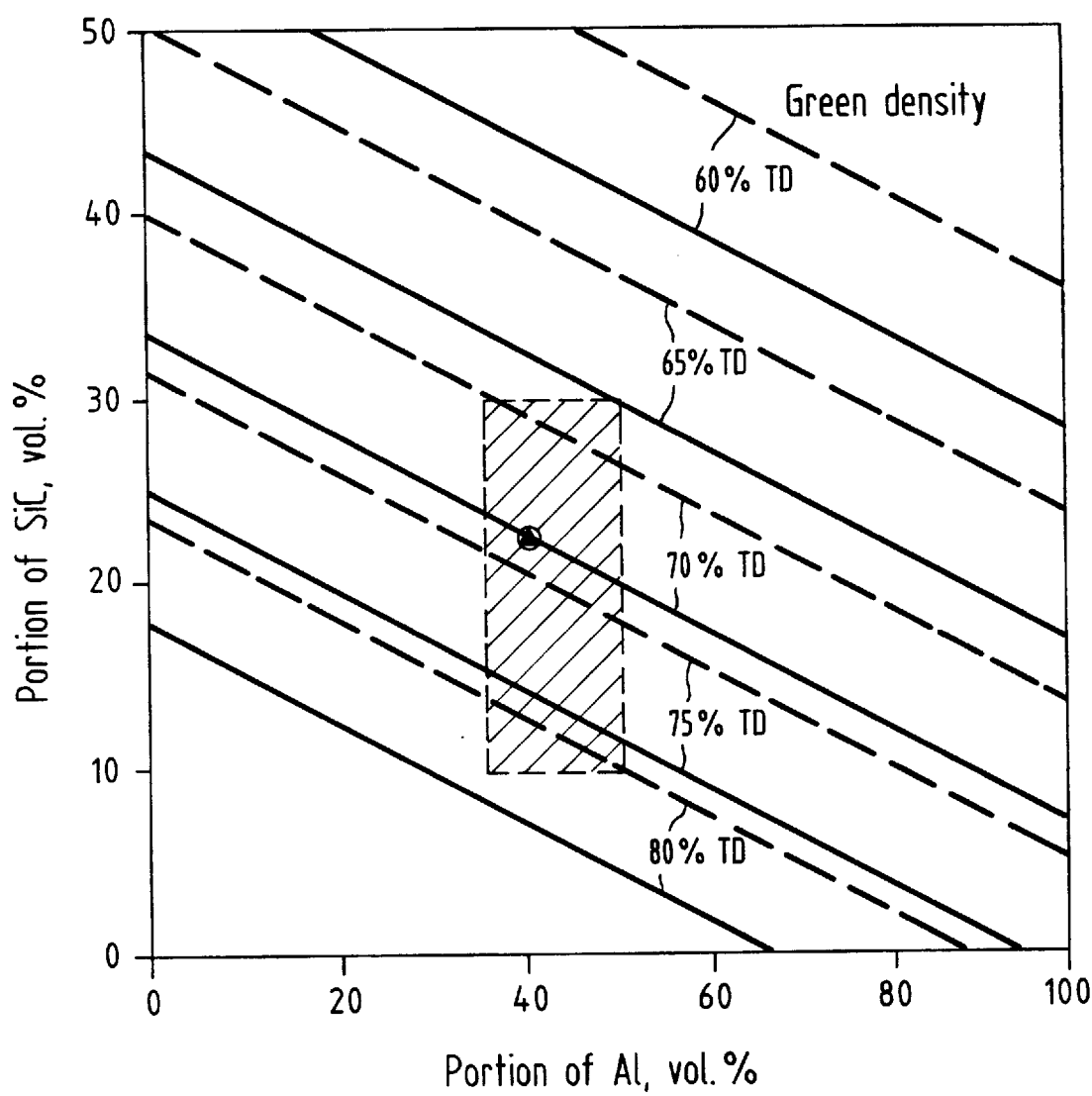
FIG. 2. shows the relationship between the proportion of SiC and Al and the green and final densiies for an $Al_2O_3$/SiC/Al mixture assuming a zero shrinkage.

FIG. 2 shows the relationship between the proportion of SiC and Al and the green and final densities for an Al$_2$O$_3$/SiC/Al mixture assuming a zero shrinkage. The broken line applies to a body with 100% TD (TD=theoretical density) and the uninterrupted line applies to a body with 95% TD. The hatched area gives the technically useful range which allows production of the corresponding green densities with isostatic pressing pressures of e.g. 300 to 700 MPa. The point shown in the hatched region of FIG. 2 indicates that a moulded ceramic body with a final density of 95% TD has to have a green density of 70% TD (which is adjustable by a corresponding pressing pressure) in order to have zero shrinkage when it is produced from a mixture of 22.5 vol. % SiC, 40 vol. % Al and 35.5 vol. % Al$_2$O$_3$. (In this case the small increase in volume during the reaction of SiO$_2$ and Al$_2$O$_3$ to form mullite which is 13% and the amount of Al$_2$O$_3$ skin which forms around the Al particles during the milling is not taken into account; it can be up to 40% of the Al powder employed depending on the milling period).

The following examples are intended to elucidate the invention further without it being limited to them. If not otherwise stated the percentages refer to volume, and the temperatures refer to the celsius scale.

EXAMPLE 1

150 g of a powder consisting of 45 vol. % Al powder (Alcan 105, 20–50 μm, Alcan, Montreal/Canada), 35 vol. % Al$_2$O$_3$ (Dycron 13, 13 μm diameter, Huls AG, Troisdorf), 15 vol. % SiC (Norton 1000 Grit, 5.0 μm diameter, Norton, USA) and 5 vol. % $ZrO_2$ (TZ-2Y, Tosoh, Japan <1 μm diameter) were milled for 8 hours in an attrition mill with 3 mm TZP milling balls. As a result of the wear on the TZP balls during the milling process (from $3Y_2O_3$–$ZrO_2$= 3YTZP) a further 4 vol. % $ZrO_2$ was introduced in relation to the total mixture. The average particle size of the powder was reduced by this to <1 μm. Afterwards the mixture was dried in a rotary dryer and subsequently isostatically pressed to form plates having the dimensions 40×40×8 mm under a pressure of 300 to 500 MPa. Subsequently the samples were heated in air at 10 K/min to 1150° C. and kept at this annealing stage for 8 hours. Then they were heat treated in a second annealing stage for 5 hours at 1500° C.

After this, all samples had a density of over 94% TD (theoretical density) whereby very fine closed pores with diameters of <0.1 μm were obtained. The bodies no longer contained SiC; they mainly consisted of mullite with a fine (<0.5 μm) particle size and of $Al_2O_3$ and finely dispersed $ZrO_2$. Traces of zircon ($ZrSiO_4$) could also be detected. The grain boundaries contained hardly any silicatic glass phases. The shrinkage (linear difference between the dimensions of the green body and the sinter body) was 0.4% at an isostatic pressing pressure of 500 MPa and 2.9% at 300 MPa. The average 4 point bend strength was 340 MPa.

EXAMPLE 2

A mixture of 40 vol. % Al and 60 vol. % SiC was attrition milled as in example 1 for 6 hours, dried and isostatically pressed at 300 MPa. The first annealing stage was for 10 hours at 1100° C., the second was for 5 hours at 1500° C. Afterwards the shrinkage was 2.5% at a density of about 95% TD. The sinter body consisted of ca. 30 vol. % SiC embedded in mullite i.e. only an outer shell of the SiC particles was oxidized and incorporated in the process to form mullite. About 4 vol. % $ZrO_2$ was introduced as a result of the wear on the milling balls.

EXAMPLE 3

A mixture of 50 vol. % Al, 30 vol. % $Al_2O_3$ and 20 vol. % SiC was attrition milled as described in example 1, dried and isostatically pressed at 300 MPa. The heat treatment was as follows: 1st stage 8 hours at 1300° C., 2nd stage 3 hours at 1650° C. Afterwards the shrinkage was 0.5% at a density of ca. 96% TD. The sinter body mainly consisted of finely crystalline mullite and $Al_2O_3$, with traces of Sic.

EXAMPLE 4

This example was used to carry out the test shown in FIG. 2.

A mixture of 22.5 vol. % SiC, 40 vol. % Al and 37.5 vol. % $Al_2O_3$ was attrition milled as described in example 1 and heat treated. A green density of 70.3% TD was achieved at an isostatic pressing pressure of 400 MPa. The sinter density was ca. 94% TD, with a shrinkage of 2.1%; i.e. the "zero" shrinkage calculated for this case was not fully attained because the oxide skin which formed around the Al particles during the attrition milling was not taken into account in the equation.

EXAMPLE 5

A mixture of 40 vol. % Al, 40 vol. % $Al_2O_3$, 10 vol. % SiC and 10 vol. % zircon (Zirkosil, Auer-Remy, <1 μm) was attrition milled as described in example 1, dried and heat treated. The final density of the sinter body was ca. 94% TD at an isostatic pressing pressure of 700 MPa with a shrinkage of 0%. Afterwards the body consisted of $Al_2O_3$ and mullite with finely dispersed tetragonal $ZrO_2$. It was also possible to detect traces of zircon by X-ray analysis. Amorphous intergranular phases could not be detected in TEM.

EXAMPLE 6

A mixture of 45 vol. % Al, 16 vol. % $Al_2O_3$, 30 vol. % SiC, 4 vol. % zircon and 5 vol. % $ZrO_2$ was attrition milled as described in example 1 and heat treated. Bodies with a density of ca. 94% TD were obtained after isostatic pressing at 300 MPa with a shrinkage of 0.9%. The sinter body which was subsequently obtained consisted of mullite with finely dispersed $ZrO_2$ and zircon.

EXAMPLE 7

A green body pressed at 300 MPa according to example 6 was subjected to a one-step heat treatment for 3 hours at 1600° C. The heating rate was 10 K/min. The sinter body consisted of >20 vol. % SiC embedded in an $Al_2O_3$ matrix with portions of mullite, $ZrO_2$ and zircon.

EXAMPLE 8

A mixture of 30 vol. % Al, 55 vol. % $Al_2O_3$ and 25 vol. % zircon was attrition milled as described in example 1 and heat treated. With a shrinkage of 3.5% and a sinter density of ca. 95% TD, the body consisted of a mullite matrix with finely dispersed $All_2O_3$ and tetragonal $ZrO_2$ after an isostatic pre-pressing at 900 MPa.

EXAMPLE 9

The attrition milled powder mixture of example 5 was isostatically pressed at 500 and 700 MPa and subsequently annealed in a 1st stage at 1200° C. for 6 hours and in a 2nd stage at 1550° C. for 3 hours. In both cases a ca. 95% TD was obtained with a shrinkage of 4.5% (500 MPa isostatic pressing pressure) and 2.7% (700 MPa). The sinter bodies consisted of mullite and $Al_2O_3$ with finely dispersed t-$ZrO_2$ and traces of zircon.

EXAMPLE 10

A mixture of 45 vol. % Al, 30 vol. % $Al_2O_3$, 15 vol. % SiC and 10 vol. % $ZrO_2$ was attrition milled as described in example 1, pressed at 300 MPa and heat treated at 1200° C. for 6 hours and at 1550° C. for 2 hours. With a density of ca. 96% TD the shrinkage was 2.5% and the body consisted of about equal parts of mullite and $Al_2O_3$ with finely dispersed tetragonal $ZrO_2$ without intergranular glass phases. The average 4-point bend strength was 380 MPa.

EXAMPLE 11

The mixture according to example 10 was annealed in a 1st stage at 1200° C. for 6 hours and in a 2nd stage at 1300° C. for 1 hour. With a slight expansion of +0.8% the density was ca. 75% TD whereby the body had a fine open porosity in the range of 0.1 to 0.7 μm.

EXAMPLE 12

The body produced according to example 11 was infiltrated with liquid Al at 60 bar at a temperature of 900° C. After this the sample was electrically conductive and had a fracture toughness of 7.5 MPa m and a 4 point bend strength of 740 MPa.

EXAMPLE 13

30 vol. % SiC platelets (Alcan, diameter 20 to 100 μm) were mixed with 70 vol. % of the attrition milled powder mixture obtained according to example 10. The admixing was carried out in the attrition mill at half speed (500 rpm) for a period of 30 min. Green bodies pressed at 300 MPa were heat treated as in example 10. The shrinkage afterwards was 0.4% with a final density of ca. 85% TD. The samples were subsequently infiltrated with Al as described in example 12. After this the average bend strength was 590 MPa.

EXAMPLE 14

As described in example 13, 40 vol. % $Al_2O_3$ platelets (Showa Aluminum, Tokyo, Japan; 15–20 μm) was mixed with a powder mixture which had been attrition milled according to example 1. Afterwards bodies isostatically pressed at 500 MPa were heat treated at 1200° C. for 8 hours and at 1350° C. for 2 hours in air. Afterwards the open porosity was >15%. The samples were infiltrated with Al as described in example 12. After this the average 4-point bend strength was 750 MPa.

EXAMPLE 15

A mixture of 45 vol. % Al, 40 vol. % $Al_2O_3$ and 15 vol. % SiC (Lonza, Switzerland UF 15, <0.5 μm) was attrition milled as described in example 1 and pressed isostatically at 300 MPa. Afterwards the samples were annealed in a 1st stage at 1200° C. for 6 hours and in a 2nd stage at 1700° C. for 2 hours. Subsequently the body consisted of $Al_2O_3$ with >20 vol. % finely crystalline mullite. It had a density of ca. 95% TD. The shrinkage was 2.1%.

EXAMPLE 16

15 vol. % $ZrO_2$ was added to the powder mixture prepared according to example 2, it was attrition milled for 8 hours and pressed at 300 MPa. Afterwards the bodies were annealed at 1100° C. for 3 hours and at 1500° C. for 1.5 hours. The shrinkage was 2.1% at a density of ca. 94% TD. Tetragonal $ZrO_2$ particles as well as SiC particles were finely dispersed in the mullite matrix.

EXAMPLE 17

This is carried out as in example 15. Mixture of 40 vol. % Al, 15 vol. % SiC (<1 μm, Sika III, Sika Company, Norway) 22.5 vol. % $Al_2O_3$ (Dycron 13, see example 1), 22.5% $Al_2O_3$ (<1 μm, CT 3000 Alcoa USA). Heating cycle as in example 1:
1st stage at 1100° C. for 15 hours
2nd stage at 1400° C. for 8 hours
Shrinkage: 2%
4-point bending strength: 355 MPa
Material is again sintered at 1600° C.
Shrinkage: 1.2%
Strength increased to 430 MPa.

EXAMPLE 18

The powder mixture from example 1 was isostatically pressed at 300 MPa and reacted for 2 hours in flowing moist air (50 cm³/min delivered through water) firstly at 1050° C. and subsequently sintered for 2 hours at 1550° C. The shrinkage in this case was 3% with a final density of 93% TD. The sample mainly consisted of mullite with a very fine particle size (<0.2 Mm).

EXAMPLE 19

A powder mixture was used as in example 1 except that 15 vol. % Si powder (H. C. Starck, Berlin, ~13 μm) was used instead of 15 vol. % SiC it was isostatically pressed at 160 MPa and subsequently reacted for 1 hour at 1050° C. in pure oxygen and subsequently sintered for 2 hours at 1550° C. During this the sample shrunk by 2.5% with a density of 91% TD. It mainly consisted of mullite.

EXAMPLE 20

100 g of the powder mixture from example 19 was mixed in acetone with 100 g coarse $Al_2O_3$ particles (~53 μm, melting corundum, H. C. Stark, Berlin) for 6 hours in a drum mixer, subsequently dried in a drying cupboard at 95° C. and afterwards it was isostatically pressed at 160 MPa. The process for the reaction bonding was also selected as described in example 19. Afterwards a solid open pored body (pore size 10–20 μm) was formed in which the large $Al_2O_3$ particles were bound via mullite bridges. There was no shrinkage during the reaction sintering.

(This experiment shows that the invention is also suitable for manufacturing very fine filter carriers.)

EXAMPLE 21

As in example 20, $Al_2O_3$ beads (~100 μm) which had been produced by dry agglomeration and subsequent density sintering were used instead of the melting corundum particles. The filter carrier which was formed from this had a pore size of 28% (pore size 20–30 μm) at a bending strength of 95 MPa.

EXAMPLE 22

0.4% by weight dispersing agent (MDIT, Hoechst AG), 0.7% by weight binding agent (D 79, Monsanto), 6% by weight binding agent (B 98, Monsanato), 3.2% by weight plasticizing agent (PEG 300, Merck AG), and 2.5% by weight plasticizing agent (Dibutylphthalate, Merck AG) was added to the mixture from example 1. This composition (35 vol. %) was admixed with 65 vol. % of a solvent (MEK and ethanol) and poured onto a tape caster to form films of 250 μm thickness. A layer of 10 films was laminated at 120° C. and subsequently burned out at 550° C. Afterwards the sample body was reaction-sintered as described in example 1. The density was 91% with a shrinkage of 0.5%. The structure was like that of example 1.

EXAMPLE 23

150 g of a powder mixture of 45 vol. % Al (as in example 1) 10 vol. % Cr (Ventron Chemie), 5 vol. % Si (H. C. Starck) and 40 vol. % $Al_2O_3$ (CT 3000, Alcoa, USA) was treated as described in example 19. The sample mainly contained $(Al/Cr)_2O_3$ (ruby) and some mullite with almost zero shrinkage.

EXAMPLE 24

It was carried out as described in example 23 except that 10 vol. % Zr (Ventron Chemie) was used instead of Cr. The body which formed contained 93% TD $Al_2O_3$ with finely dispersed tetragonal $ZrO_2$ as well as some mullite.

I claim:

1. Reaction-formed molded ceramic body having a mullite matrix that is virtually free of intergranular phases, comprising
   (a) from 20–100 vol. % mullite and from 0 to 80 vol. % of at least one oxide selected from the group consisting of $Al_2O_3$, $ZrO_3$, zircon, cordierite and $MgAl_2O_4$, wherein said mullite is formed by heat treating, in an oxygen containing atmosphere, a green body moulded from a finely dispersed powder mixture of aluminum, $Al_2O_3$, and a material containing Si.

2. Moulded ceramic body as claimed in claim 1, wherein the powder mixture contains at least 10 vol. % aluminum.

3. Moulded ceramic body as claimed in claim 1 wherein the material containing Si is selected from the group consisting of Si, SiC, $Si_3N_4$, $ZrSiO_4$, $MgSiO_3$, and cordierite.

4. Moulded ceramic body as claimed in claim 1, wherein at least a portion of the aluminum powder is replaced by an aluminum alloy powder containing Si.

5. Moulded ceramic body as claimed in claim 4, further comprising adding fine-grained SiC powder with an average diameter of less than <1 μm to said powder mixture.

6. Moulded ceramic body as claimed in claim 1, wherein the change in length between the green body and the heat treated body is less than 10%.

7. Moulded ceramic body as claimed in claim 1, wherein it further comprises particles selected from the group consisting of spherical, platelet and fibre particles.

8. Moulded ceramic body as claimed in claim 7, wherein said spherical, platelet, or fibre particles are present in said ceramic body in a proportion between 5 and 50 vol. %.

9. Moulded ceramic body as claimed in claim 7, wherein said spherical, platelet, or fibre particles have dimensions between 5 and 500 μm.

10. Moulded ceramic body as claimed in claim 7, wherein the particles are selected from the group consisting of oxides, carbides, nitrides, silicides and borides.

11. Moulded ceramic body as claimed in claim 1, wherein at least a portion of aluminum powder is replaced by at least one metal or metalloid selected from the group consisting of Co, Cr, Cu, Fe, Mg, Mn, Nb, Ni, Ta, Ti, V, Zn, and Zr.

12. Moulded ceramic body as claimed in claim 11, wherein
up to 50% of the aluminum is replaced.

13. Process for producing a reaction-formed, moulded ceramic body having a mullite matrix that is virtually free of intergranular phases and contains 20–100 volume % mullite and 0 to 80 volume % of at least one oxide selected from the group consisting of $Al_2O_3$, $ZrO_3$, zircon, cordierite and $MgAl_2O_4$, comprising:

heat treating, in an oxygen containing atmosphere, a green body moulded from a finely dispersed powder mixture of aluminum, $Al_2O_3$, a material containing Si, and at least one oxide selected from the group consisting of $Al_2O_3$, $ZrO_3$, zircon, cordierite and $MgAl_2O_4$ to form said moulded ceramic body.

14. Process as claimed in claim 13, wherein said green body is formed from attrition milling said powdered mixture.

15. Process as claimed in claim 14, wherein said powdered mixture is attrition milled for at least one hour.

16. Process as claimed claim 14, wherein the powdered mixture is attrition milled in a liquid medium with coarse $Al_2O_3$ powder.

17. Process as claimed in claim 16, wherein the coarse $Al_2O_3$ powder has a size between 3 and 30 μm.

18. Process as claimed in claim 17, wherein the material containing Si is SiC or $Si_3N_4$ having a size less than 1 μm.

19. Process as claimed in claim 16, wherein the coarse $Al_2O_3$ powder is replaced completely or partially by coarse SiC, $Si_3N_4$ powder or coarse SiC and $Si_3N_1$ powder.

20. Process as claimed in claim 19, wherein the coarse $Al_2O_3$ powder is replaced completely or partially by fine $Al_2O_3$ having a size less than 1 μm.

21. Process as claimed in claim 14, wherein the heat treatment is carried out at a temperature between 700° C. and 1700° C.

22. Process as claimed in claim 21, wherein the green body is first reaction-annealed at temperatures of between about 700° and 1300° C. and subsequently sintered at about 1300° to 1700° C.

23. Process as claimed in claim 13, wherein the heat treatment is carried out in an atmosphere comprising moist oxygen, moist agitated oxygen, moist and agitated oxygen, a mixture of oxygen and argon, a mixture of oxygen and helium, or a mixture of oxygen, argon, and helium.

24. Process as claimed in claim 21, wherein
the conditions of the heat treatment are selected such that a defined fine and open porosity results in the ceramic body.

25. Process as claimed in claim 13, wherein pores in the moulded ceramic body obtained are infiltrated with a liquid in a vacuum or under pressure.

26. Process as claimed in claim 25, wherein said pores are infiltrated under a pressure of 0.1 to 100 MPa.

27. Process as claimed in claim 25, wherein the liquid is selected from the group consisting of Al, Al alloy, Si and Si alloy.

28. Process as claimed in claim 18, wherein
the moulded body is annealed in an atmosphere containing oxygen or nitrogen for surface treatment.

29. Moulded ceramic body as claimed in claim 1, wherein the power mixture contains from 25 to 50 vol. % aluminum.

30. Moulded ceramic body as claimed in claim 1, wherein the change in length between the green body and the heat treated body is less than 1%.

31. Process as claimed in claim 15, wherein said powdered mixture is attrition milled for 1 to 8 hours.

* * * * *